Figure 1:
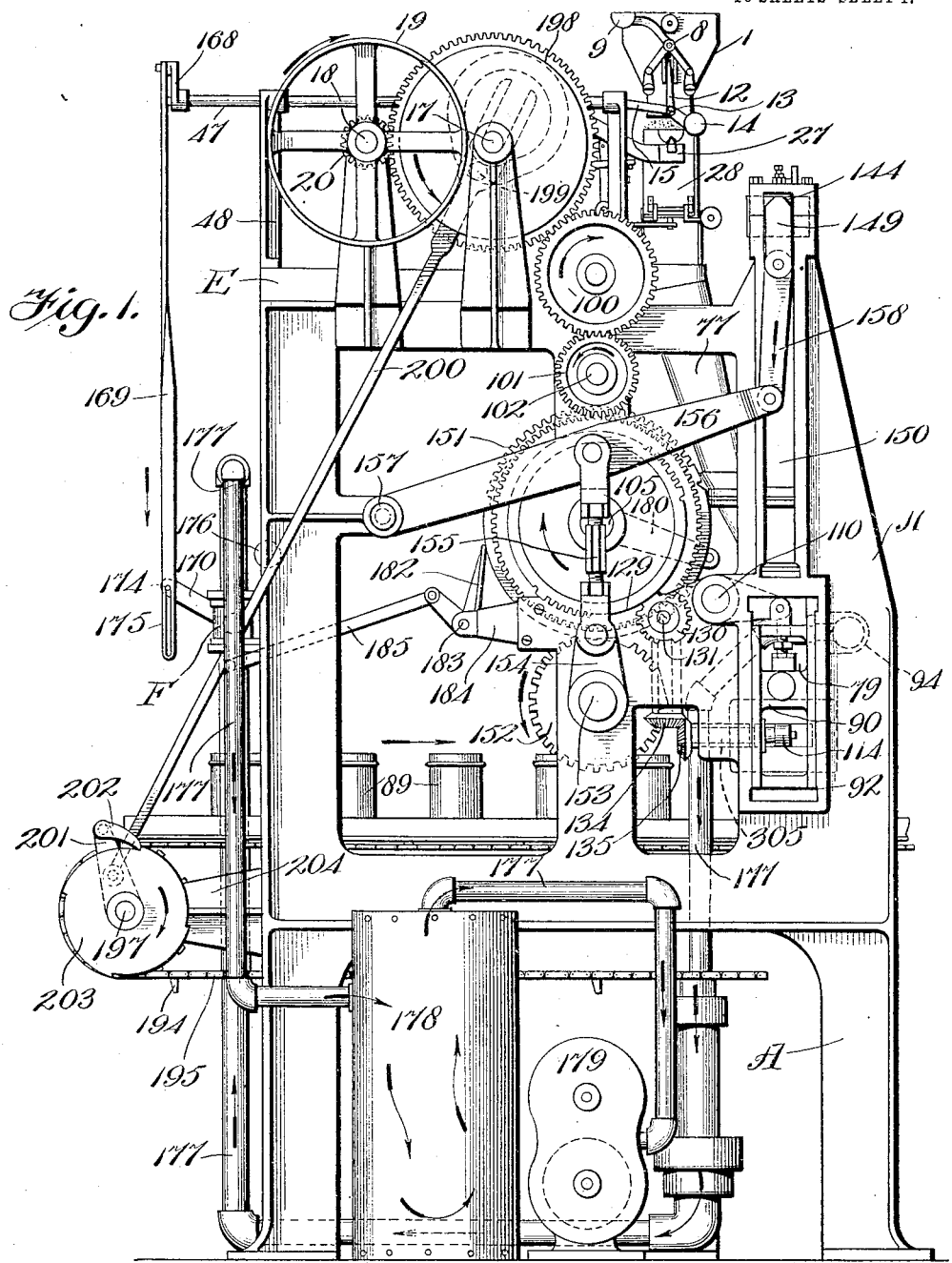

H. G. DEWEY.
AUTOMATIC WEIGHING AND FILLING MACHINE.
APPLICATION FILED JULY 11, 1912.

1,125,271.   Patented Jan. 19, 1915.
10 SHEETS—SHEET 6.

Witnesses
H. W. Primm
Byron B. Collings.

Inventor
H. G. Dewey, by
Attorneys

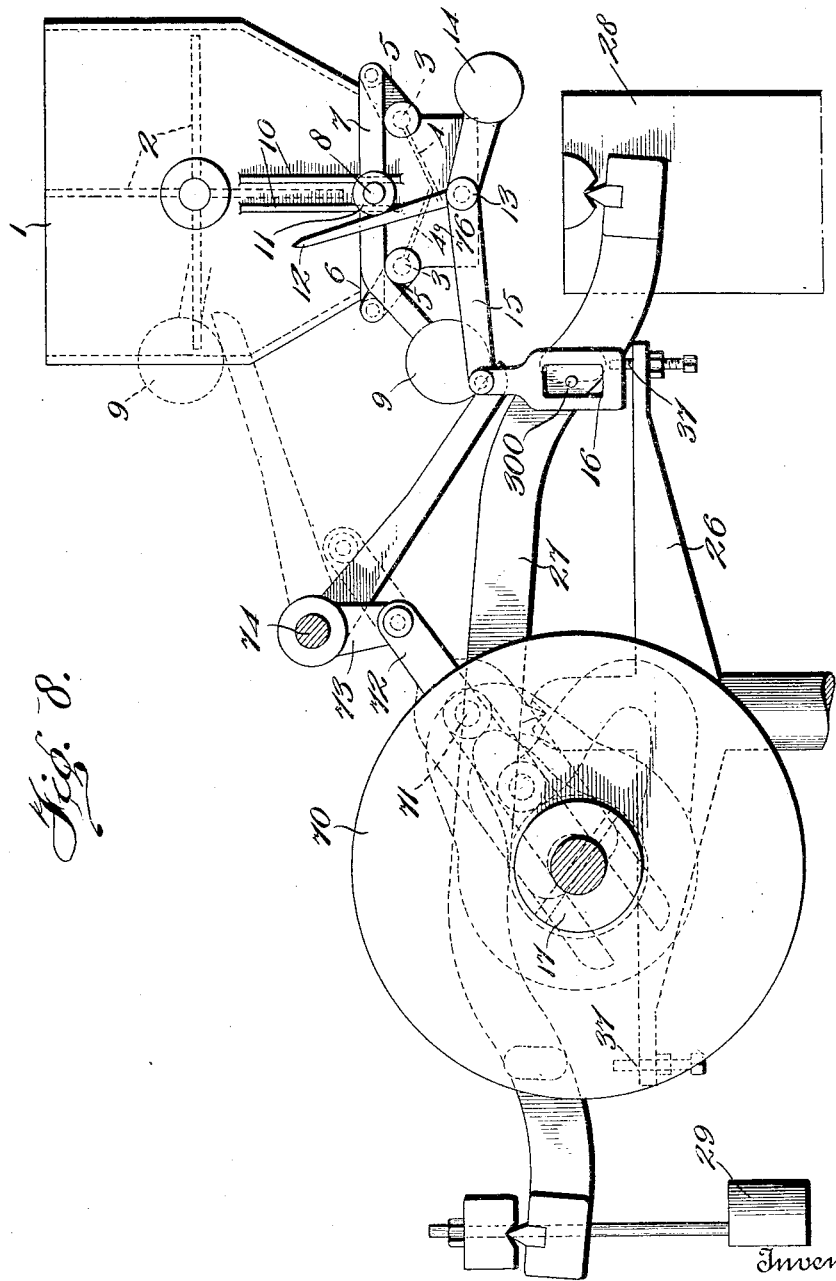

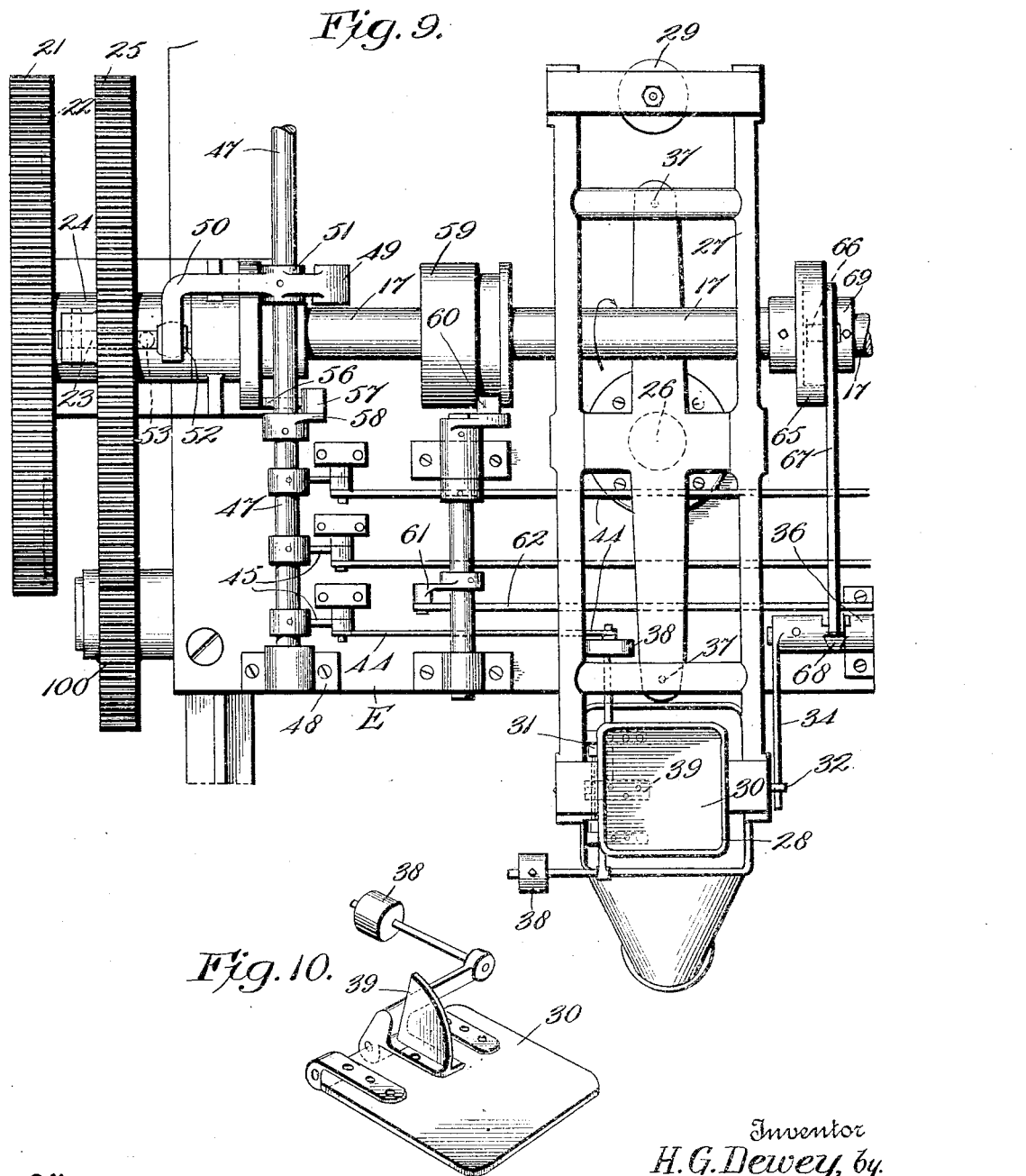

H. G. DEWEY.
AUTOMATIC WEIGHING AND FILLING MACHINE.
APPLICATION FILED JULY 11, 1912.

1,125,271. Patented Jan. 19, 1915.
10 SHEETS—SHEET 9.

H. G. DEWEY.
AUTOMATIC WEIGHING AND FILLING MACHINE.
APPLICATION FILED JULY 11, 1912.

1,125,271.

Patented Jan. 19, 1915.
10 SHEETS—SHEET 10.

Witnesses
Edwin J. Beller
H. W. Primm

Inventor
H. G. Dewey
by Wickersham Fisher &
Witherspoon
Attorneys

UNITED STATES PATENT OFFICE.

HAYWOOD GUION DEWEY, OF EAST ORANGE, NEW JERSEY, ASSIGNOR TO SINGLE SERVICE PACKAGE CORPORATION OF AMERICA, OF NEW YORK, N. Y., A CORPORATION OF NEW JERSEY.

AUTOMATIC WEIGHING AND FILLING MACHINE.

1,125,271.      Specification of Letters Patent.      Patented Jan. 19, 1915.

Original application filed October 17, 1911, Serial No. 655,157. Divided and this application filed July 11, 1912. Serial No. 708,924.

*To all whom it may concern:*

Be it known that I, HAYWOOD GUION DEWEY, a citizen of the United States, residing at East Orange, in the county of Essex and State of New Jersey, have invented certain new and useful Improvements in Automatic Weighing and Filling Machines; and I do hereby declare the following to be a full, clear, and exact description of the invention, such as will enable others skilled in the art to which it appertains to make and use the same.

This invention relates to a machine for weighing predetermined quantities of powder or other finely divided material, especially adapted for use in connection with the means for packing such material into cans or other containers such as disclosed in my copending application #655,157, filed October 17, 1911, for automatic filling machines, of which this application is a division.

The main objects of this invention are to produce an automatic weighing mechanism which will segregate a predetermined quantity of the material, and deliver the same into a suitable chute or conveyer which in turn is capable of conducting said powder to an air exhausting device, from which it may be delivered into automatically positioned receptacles as disclosed in said application above. At the same time, I provide suitable clutch and cam devices for automatically so controlling the various parts of the mechanism as to cause them to first weigh the powder, then pack and fill the cans while exhausting the air from the powder and cans, and lastly to restore all the parts to their original position ready for another cycle of operations.

To these ends the invention comprises the novel details of construction and combinations of parts providing a rapid, positive and efficient automatic weighing means adapted to weigh one or a plurality of charges of powder, and to deliver the same to suitable packing or filling means which is controlled by the weighing mechanism, and which effectually prevents any noticeable loss of the finely divided material by spilling or dissipation, into the surrounding atmosphere as disclosed in my said prior application. The whole being combined with suitable conveying means for the receptacles, to bring them successively into positions to be filled, and with suitable connecting mechanisms by which all the various parts are so governed and timed as to cause the above operations to be positive, efficient, certain and automatic in action, all as will be more fully described hereinafter and particularly pointed out in the claims.

Figure 2:
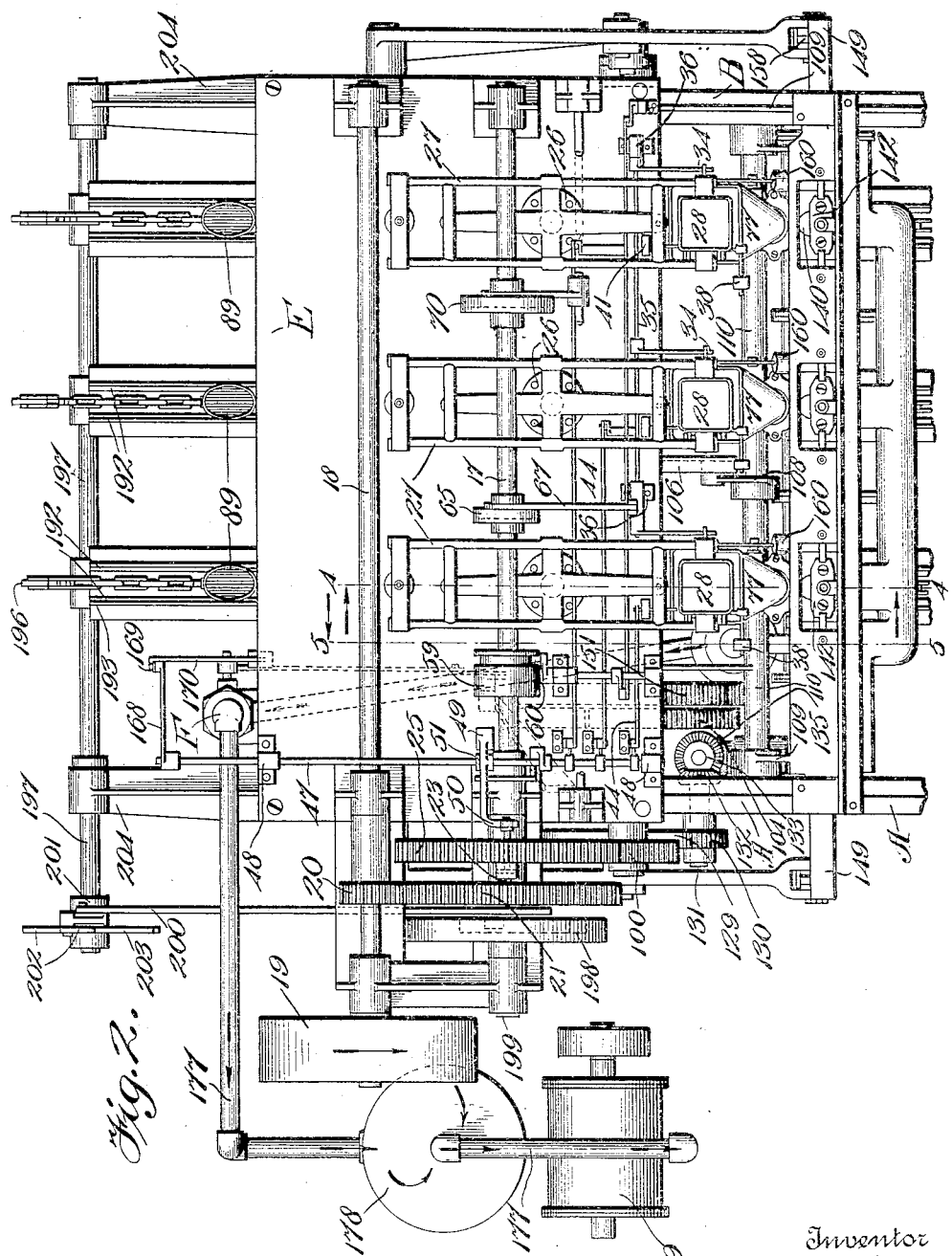
Figure 3:
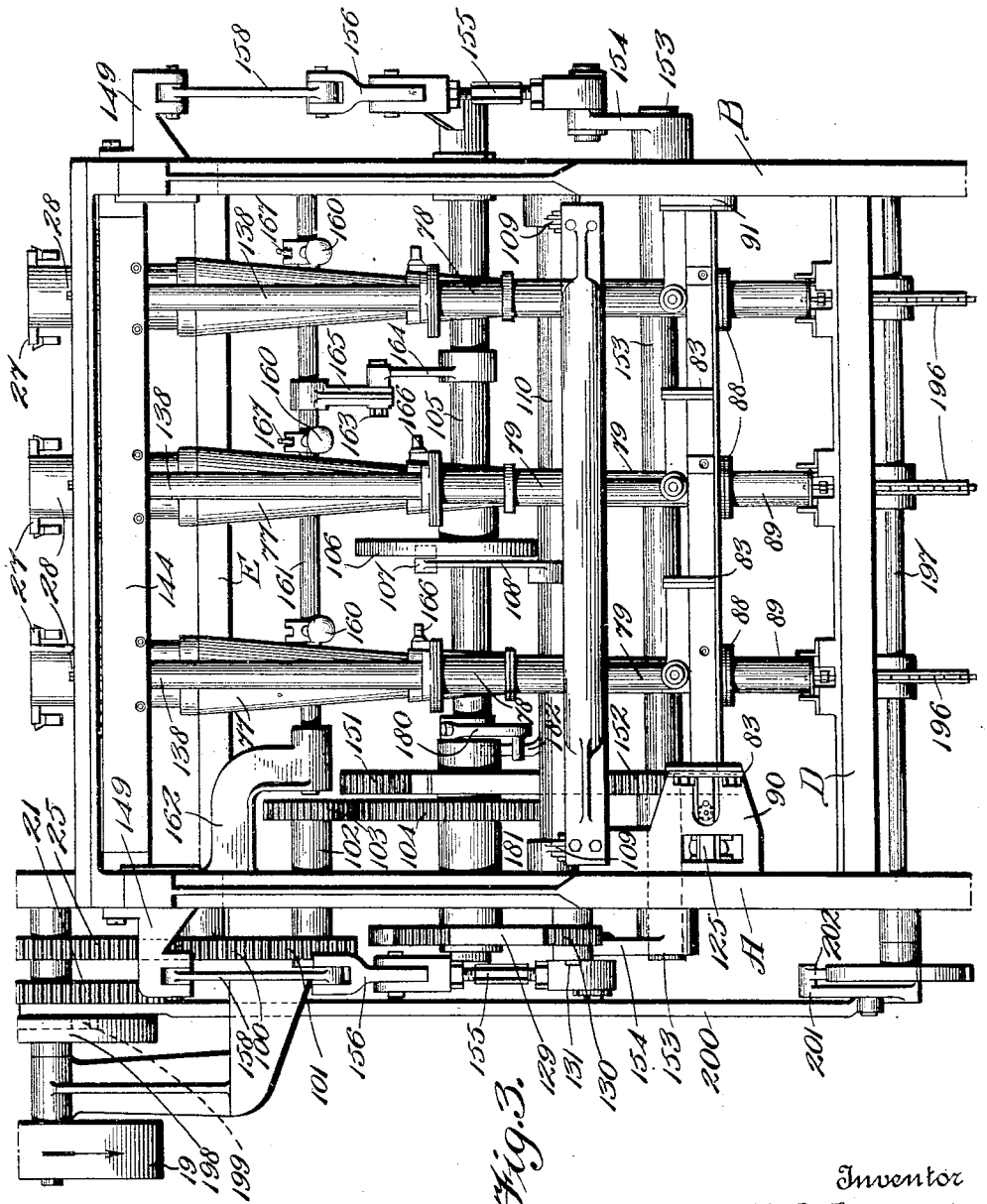
Figure 4:
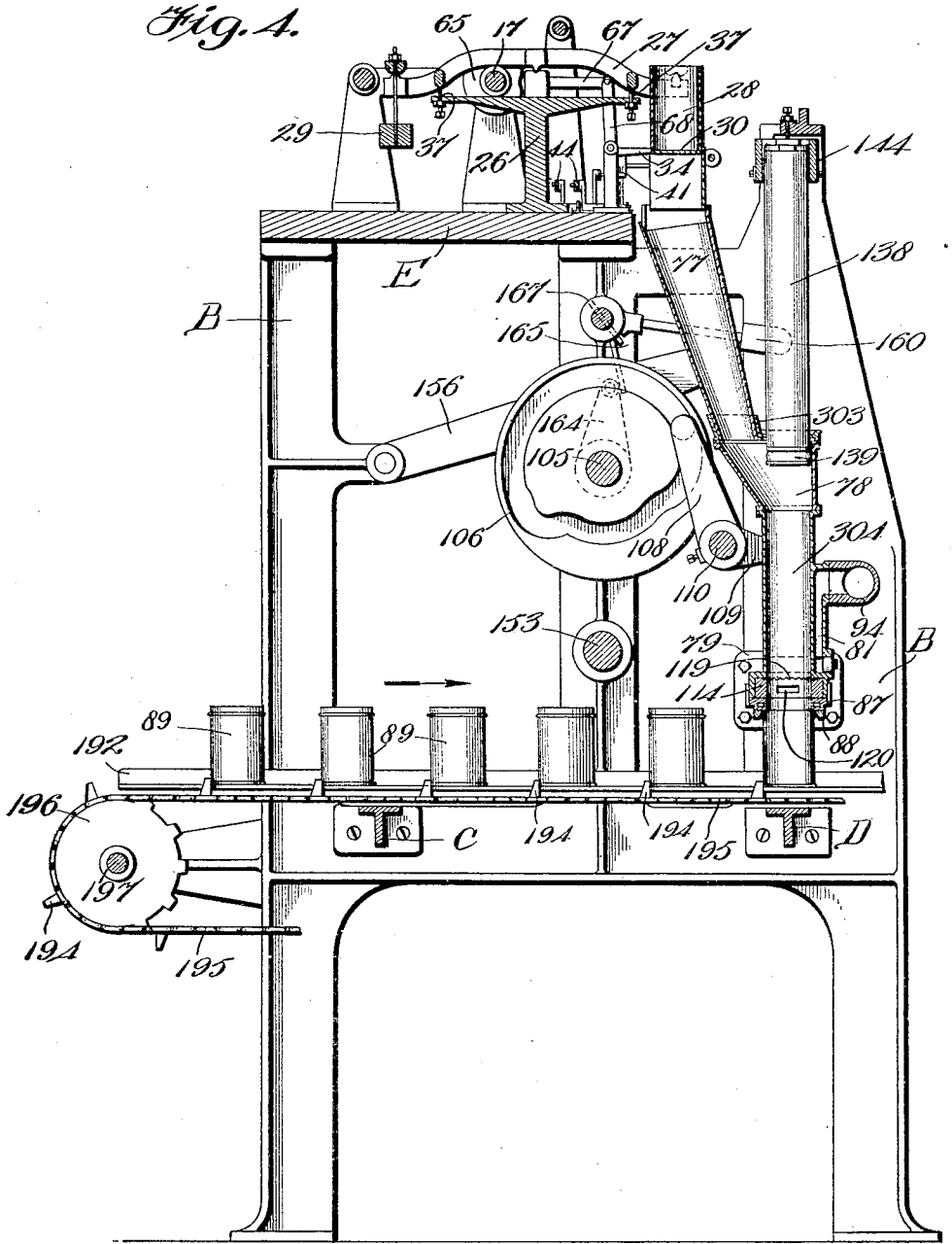
Figure 5:
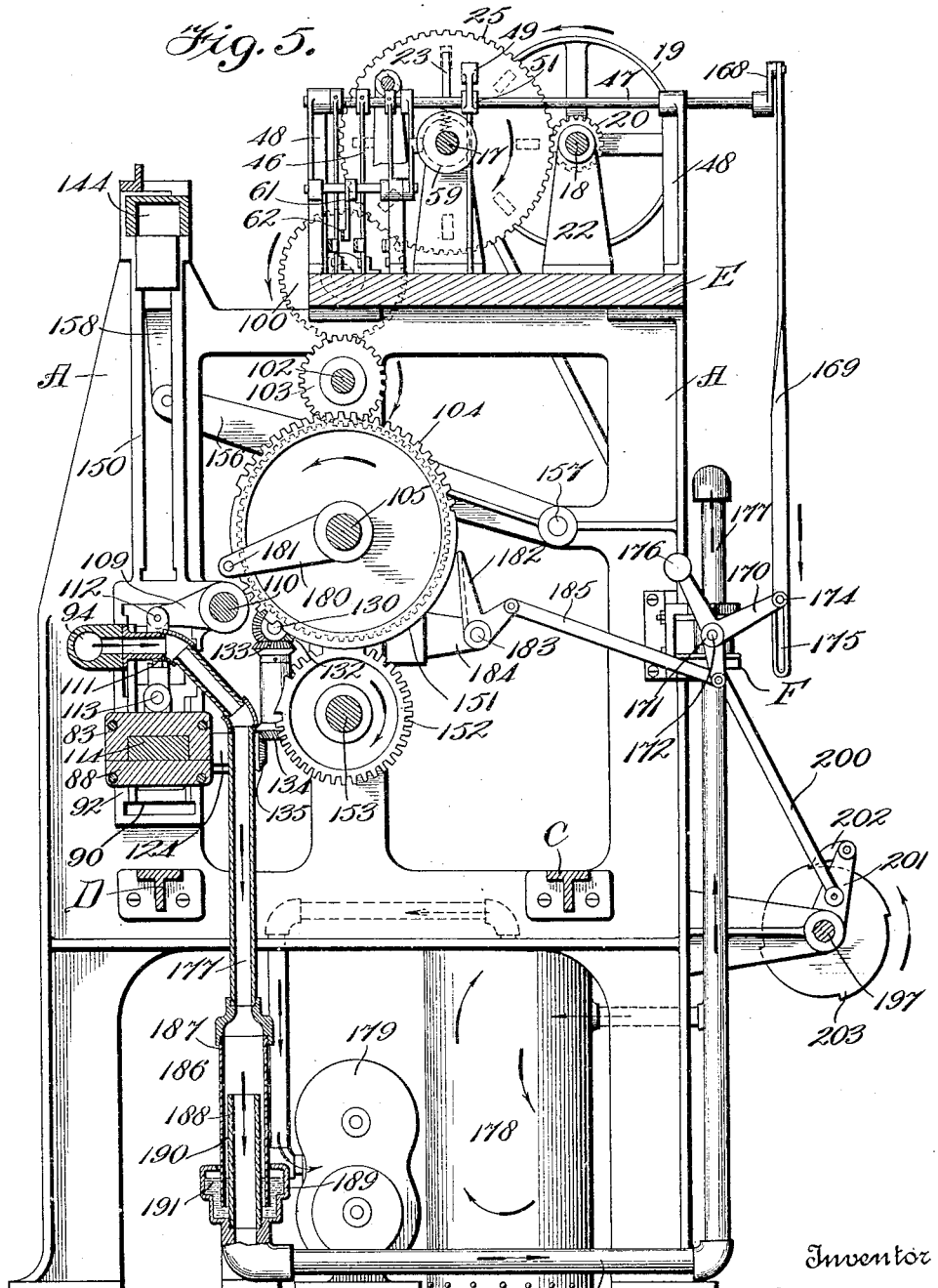
Figure 6:
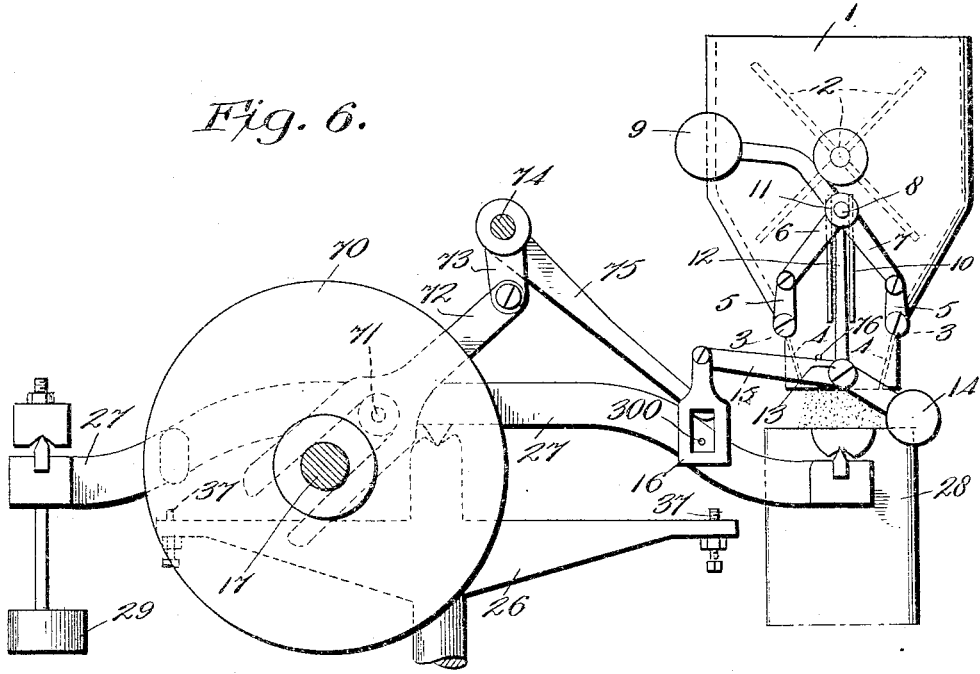
Figure 7:
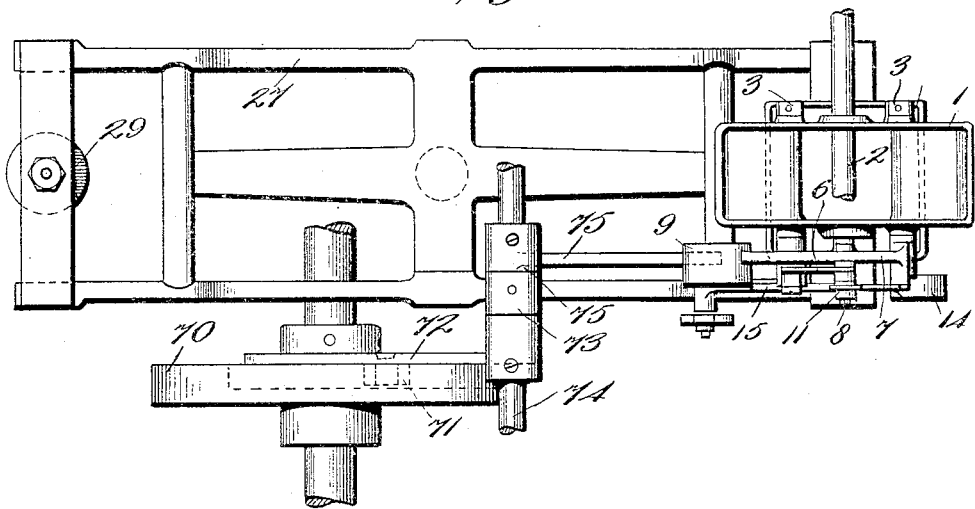
Figure 11:
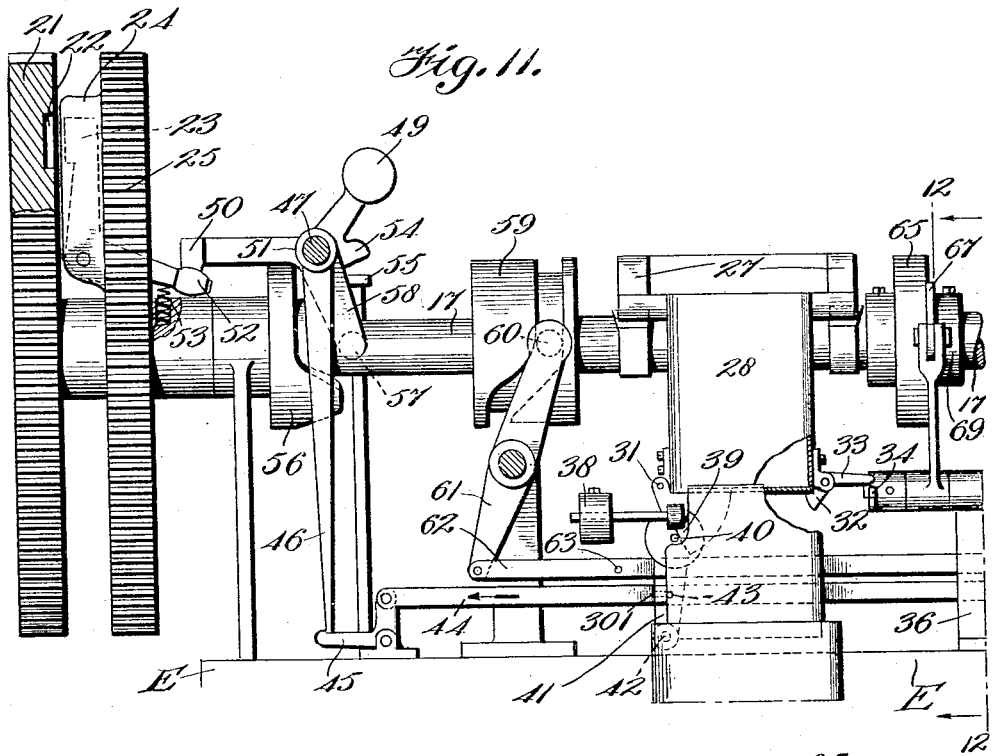
Figure 12:
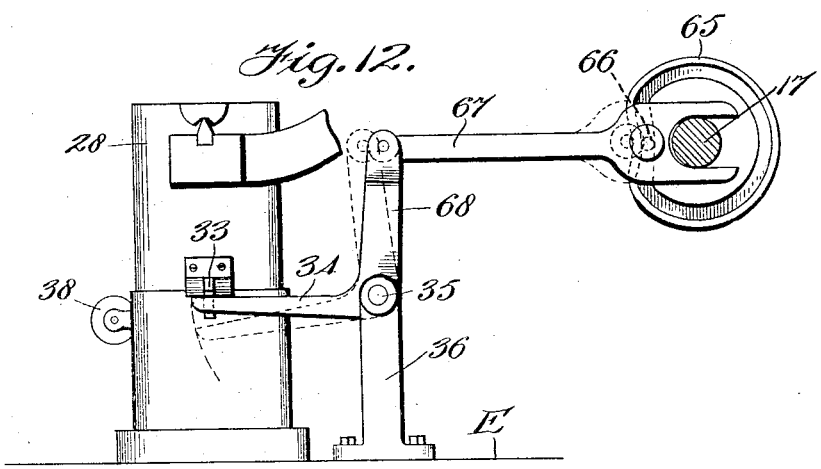
Figure 13:
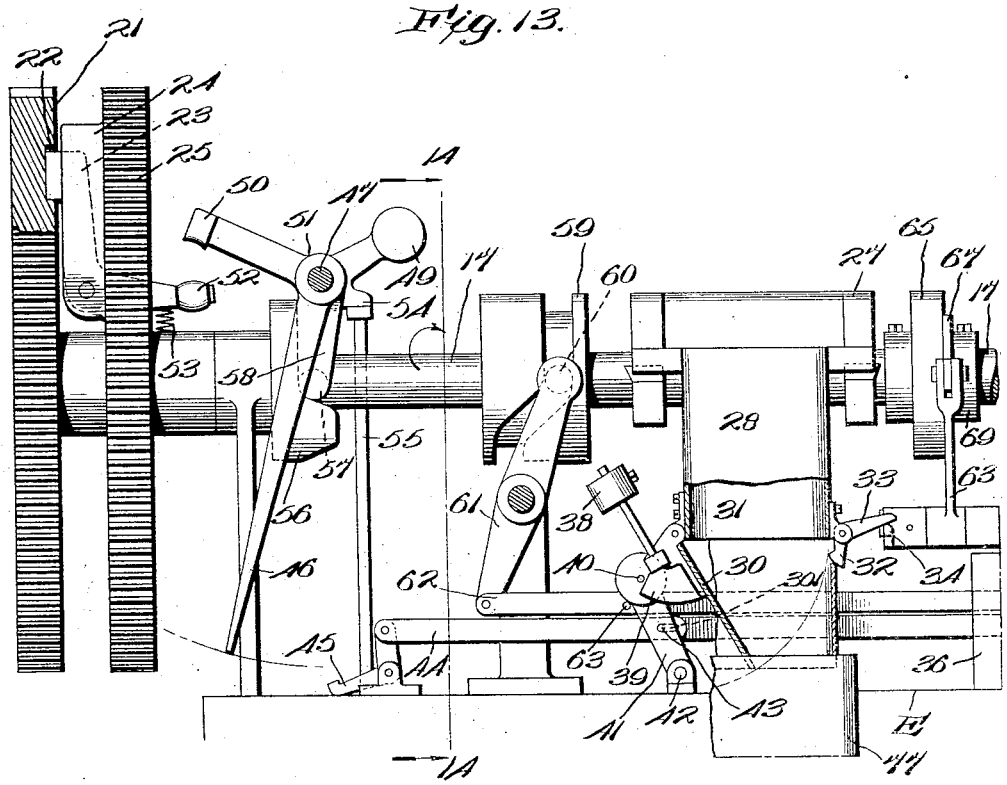
Figure 14:
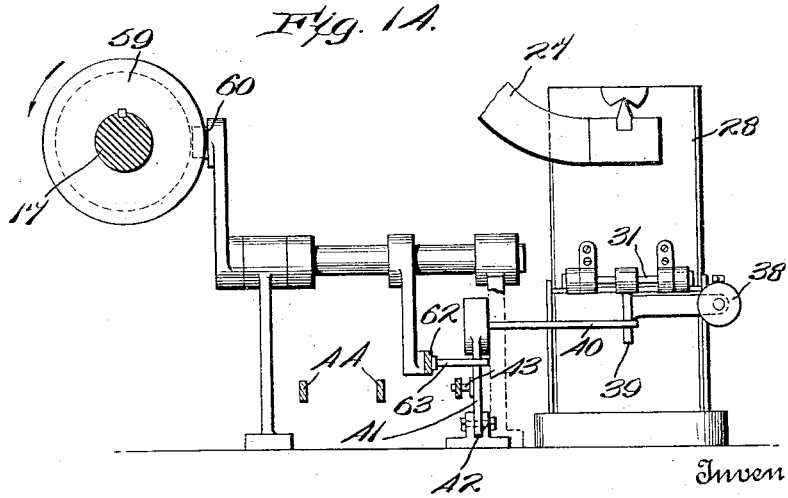

Referring to the accompanying drawings forming a part of this specification in which like characters designate like parts in all the views:—Figure 1 is a side elevational view of a machine built in accordance with my invention; Fig. 2 is a plan view of the machine with part of the automatic weighing mechanism omitted; Fig. 3 is a front elevational view with the automatic weighing mechanism, vacuum pump and vacuum tank removed; Fig. 4 is a cross sectional view taken on the line 4—4 of Fig. 2, and looking in the direction of the arrows; Fig. 5 is a cross sectional view taken on the line 5—5 of Fig. 2 and looking in the direction of the arrows; Fig. 6 is an enlarged detail view of the automatic weighing mechanism; Fig. 7 is a plan view of the parts shown in Fig. 6; Fig. 8 is an enlarged detail view of the automatic weighing mechanism similar to Fig. 6, but showing the parts in their extreme or cut-off position after the weighing operation is completed; Fig. 9 is an enlarged detail top plan view of a portion of the bucket discharging and clutch operating mechanisms; Fig. 10 is a detail perspective view of the inverted bottom of one of the scale buckets; Fig. 11 is a front elevational view of the parts shown in Fig. 9; Fig. 12 is a cross sectional view taken on the line 12—12 of Fig. 11, showing the scale bucket discharge mechanism; Fig. 13 is a front elevational view, similar to Fig. 11, of the parts shown in Fig. 9, but showing the discharging and clutch operating mechanism in their extreme positions; and Fig. 14 is a cross sectional view taken on the line 14—14 of Fig. 13 and looking in the direction of the arrows.

This machine comprises an automatic weighing means, associated with a packing means, a can conveying or carrying means, and clutch and cam mechanisms, all so connected and timed, that a plurality of cans, or other containers, may be rapidly and successively filled with a predetermined amount of powder, as will now appear.

In the preferred construction, shown in the drawings, the machine comprises three complete weighing, packing and can conveying mechanisms, all of which are under the control of one set of operating means, but for the sake of clearness, only one unit and its coacting operating means will be described in detail, it being understood that the other units are duplicates, and that as many other units as may be desired, may be added to the machine at will.

The machine is of the general shape and construction shown in the drawings, and is provided with the side frames A and B held together by the truss beams such as C and D, and the top or bed plate E, (Fig. 4).

Mounted on any suitable support, attached to the top plate E of the machine is a feed hopper 1, (see Figs. 1, 6, 7 and 8) which is adapted to receive powder or other material to be weighed and packed by the machine. Any suitable agitating means 2 to facilitate the feeding of the powder, may be mounted within the hopper and driven from any convenient source of power. This hopper is preferably provided at its discharge end with two rock shafts 3 (Figs. 6 and 7) on which are mounted the cut-off gates 4. Short arms 5—5 rigidly mounted on the ends of the rock shafts 3 are pivotally connected to the toggle levers 6 and 7, the lever 7 being extended beyond the movable stud 8 connecting said levers, and terminating in a weight 9. This stud 8 is of sufficient length to extend on its inner end between the guides 10, and has freely mounted on its outer end an anti-friction roller 11, which consequently travels in a vertical plane by reason of said stud 8 and guides 10.

A trip trigger 12 is pivotally mounted on a stud 13 which is located below the roller 11 and approximately in the vertical line of which the said roller travels. This trigger 12 is preferably of the construction shown, and is provided with the short weighted arms 14 and a longer weighted arm 15, which arm 15 has pivotally mounted on its outer end a trip yoke 16.

The mechanism just described is known as the powder feed mechanism and is automatically controlled by the scale mechanism, which latter also controls the other movements of the machine which are in synchronism with the weighing operations, as will appear below.

Mounted in suitable bearings on the top plate E and running transversely the entire width of the machine is the clutch shaft 17 (see Figs. 1, 2, 4 and 5) which operates intermittently, making one revolution for each cycle of the machine, as will be described. Mounted also in suitable bearings on the top plate E, and running parallel with the shaft 17, is the constantly rotating main power shaft 18 which is driven by the pulley 19, from any suitable source of power.

20 indicates a spur pinion rigidly fixed on the power shaft 18, which transmits power to the spur gear 21, loosely mounted on the clutch shaft 17. The spur gear 21 is provided with a series of clutch pockets 22 on its inner face (see Figs. 5 and 11) which pockets are adapted to receive the driving end of a pawl 23, which is pivotally mounted in the lug 24, carried by the spur gear 25, fast on the clutch shaft 17. Consequently, the spur gear 21, pawl 23, and spur gear 25, constitute a clutch which imparts motion to the clutch shaft 17, but of course any other suitable connection may be provided.

The operation by which this clutch mechanism is controlled by the scale mechanism will now be described.

Mounted on the bed plate E is the scale yoke or support 26 (Fig. 4) and on this support is the scale beam 27 which carries on one end the weighing bucket 28 and on its inner end the counter-balancing weight 29. The bottom 30 of the bucket is hinged as at 31 (see Figs. 11 and 12) and held in a closed position by the latch 32 pivoted on the side of the bucket. This latch 32 is provided with a trip arm 33 adapted to be operated by the movable trip 34 mounted on the trip shaft 35. Said trip shaft 35 is freely mounted in the brackets 36 on the top plate E of the machine and is of sufficient length to provide a trip 34 for each weighing unit as shown in Fig. 2. This trip 34 is struck by the arm 33 and releases the bottom 30 of the bucket when it has reached its lowest position after having received its predetermined amount of powder, as will be readily understood. During the downward movement of the scale beam 27 under the influence of a predetermined amount of powder, the pin 300 carried by said beam (see Figs. 6 and 8) contacts with the bottom of the trip yoke 16 and displaces the trip trigger 12 from beneath the anti-friction roller 11 which allows the toggle levers 6 and 7 under the influence of the weight 9 to close the cut-off gates 4—4 and stop the flow of powder from the weighing bucket, as will be clear from the drawings.

The downward movement of the bucket 28 is limited by the scale beam 27 coming into contact with the adjustable stops 37 mounted on the arms of the scale beam support or yoke 26. The bottom 30 of the scale bucket is further provided with a counterweight 38 (Fig. 11) to return it to its closed position after the contents have been discharged, and at the same time the scale beam 27 under the influence of the weight 29 (Figs. 6 and 8) returns to its initial position, to receive a subsequent charge of powder. Sufficient space is allowed between the pin 300 and the top of the trip yoke 16 to permit of the return of the scale beam 27. As the bottom 30 of the weighing bucket swings downward to discharge the contents of said bucket, the lug 39 thereon (Figs. 10, 13 and 14) engages the pin 40 on the weighted lever 41, pivoted as at 42 to the top plate E. This engagement of the lug 39 carried by the bottom 30 with the pin 40, throws the weighted lever 41 to one side as shown in Fig. 13. During this movement the pin 43 also carried by the lever 41, moves in the slot 301 in the bar 44 (Figs. 11, 13 and 14) and the weighted lever 41 accumulates sufficient momentum to cause the pin 43 to move the bar 44 longitudinally and unhook the latch 45 pivoted on the top plate E. The unhooking of the latch 45 releases the holding arm 46 rigidly held on the rock shaft 47, which shaft is journaled in bearings 48 on the plate E (see Figs. 2 and 9), and runs across the machine substantially at right angles to the shaft 17. The movement of the rock shaft 47 under the influence of the weighted end of the arm 49 (Fig. 11) disengages the arm 50, of the bell crank lever 51, from the anti-friction roller 52, on one end of the pawl 23, which permits said pawl under the influence of the spring 53 to be thrown into engagement with one of the clutch pockets 22 in the face of the gear 21 and therefore causes power to be transmitted through said pawl to the shaft 17.

The movement of the rock shaft 47 under the influence of the weighted arm 49 is limited by the lug 54 on the weighted arm 49 contacting with the stop 55 carried by the top plate E.

As previously stated, the operation of one weighing unit only has been described. If, however, a plurality of units are employed, as in the construction shown in Fig. 2, it is evident that the rock shaft 47 will not be free to release the pawl 23 until all of the weighing buckets have discharged their contents, so that a new cycle of operations cannot be begun until each of the units is ready for it.

Rigidly mounted on the clutch shaft 17 is a cam 56 (Fig. 9) which engages the roller 57 carried on the end of an arm 58 rigidly mounted on the rock shaft 47. Early in the rotation of the clutch shaft 17, which is in the direction of the arrow (Figs. 9, 11 and 13) the roller 57 will follow under the influence of the weight 49 the face of the cam 56 and return the rock shaft 47 and the bell crank 51 to their initial positions; that is, from the positions shown in Fig. 13, to those shown in Fig. 11. This return movement brings the holding arm 46 of the bell crank into proper position to reëngage the pivoted latch 45 and also brings the arm 50 of said bell crank into the path of the anti-friction roller 52 so that upon the completion of one revolution of the clutch shaft 17 the clutch will be disengaged by reason of this anti-friction roller contacting with the said arm 50. Immediately following the action of the cam 56, the cam 59, which is also rigid with the clutch shaft 17, operates through the roller 60, lever 61, and reset bar 62, and pin 63 to return the weighted lever 41 to the position shown in Fig. 11. During this return movement of the lever 41, the pin 43 acting in the slot 301 in the bar 44 resets the pivoted latch 45 and causes the same to engage the holding arm 46 and to retain the rock shaft 47 and its coacting parts in their initial positions. The cam 59 after having reset the weighted arm 41 and pivoted latch 45, returns the reset bar 62 to its initial position leaving the weighted arm 41 free to perform a subsequent operation, as has been previously described. To prevent the scale bucket 28 from discharging its contents if it should receive a second charge of powder during a single cycle of operations, the trip 34 is lowered beyond a possible engagement with the trip arm 33 immediately after the machine starts, as shown by dotted lines in Fig. 12. This movement is effected by the cam 65, on the clutch shaft 17, through the roller 66, mounted on the cam bar 67, and lever 68. The trip 34 is returned to its upper or tripping position by the continued rotation of the cam 65 slightly in advance of the completion of the cycle of the clutch shaft 17.

A set collar 69 (Figs. 9, 11 and 13) is mounted on the shaft 17 and abuts against the cam bar 67, as a keeper, to hold the cam bar in engagement with the cam.

From the mechanism so far disclosed, it will be clear that if power is constantly applied to the pulley 19, the operation of filling a bucket 28 with a predetermined amount of powder, and of the weighing mechanism which determines this amount, will so control the clutch mechanism 23 as to cause power to be automatically applied to the shaft 17 after each weighing operation. And further, if a plurality of weighing units are employed, power will not be applied to said shaft 17 until the last unit has completed its cycle of movements. It will also be clear that after the last weighing bucket has discharged its contents, the mechanisms will be automatically restored to their normal positions ready to repeat the original cycle of movements. After the bottom 30 of a weighing bucket has been released by the latch 33, the contents of the bucket 28 passes down a chute 77 (Fig. 4) into the filling or packing mechanism which latter causes said contents to be suitably filled into the cans or receptacles 89, all as will be clear from my application #655,157 above. Before the powder or other finely divided material however, is passed into the said cans, it is very desirable that the air should be withdrawn from the containers, in order to prevent the powder from floating in the air that would otherwise be contained therein, and also in order to prevent said air from interfering with the efficient action of the packing plungers. Therefore, it is very desirable to control the exhaustion of the containing vessels from the weighing mechanism, and to this end during the movement of the rock shaft 47, above described, and in addition to causing the clutch to transmit power to the shaft 17, the weighing mechanism also controls the air exhaust valve F (Figs. 2 and 5) by means of connections between said shaft 17 and said valve, as will also be clear from my application above.

When a new cycle of operations begins, a cam 70 (Figs. 2, 6, 7 and 8) rigidly mounted on the clutch shaft 17 opens the powder cut-off gates 4, 4 within the hopper 1, and allows a new charge of powder to flow into the weighing bucket 28. The opening of these cut-off gates 4, 4 by the cam 70 is effected through the connections comprising a roller 71 on the cam connection 72 which is pivotally connected to the short arm 73 rigidly fixed to the rock shaft 74. A lifting arm 75 also rigidly fixed to the rock shaft 74 contacts at its lower end with the weight 9 and elevates it from the position shown in full lines in Fig. 8 to that shown in dotted lines, and during this movement the toggle levers 6 and 7 by reason of their pivot connection at 8 elevate the anti-friction roller 11 and allow the trip trigger 12 to assume the position shown in Fig. 6 supporting the weight 9, and holding the cut-off gates 4, 4 in their open position.

76 indicates a stop pin in the side wall of the hopper to limit the upward movement of the lever 15 and therefore the swinging movement of the trip trigger 12.

The continued rotation of the cam 70 returns the lifting arm 75 to its initial position shown in Fig. 6, where it remains during the completion of the new cycle of movements leaving the weight 9 free to fall and again close the cut-off gates 4, 4 as previously described.

Having described one complete cycle of movements including the weighing of a charge of material and the manner in which the scale mechanism operates to control and start the shaft 17, I will now proceed with a very brief description of the packing mechanism, it being supposed that a can 89 is in position to receive a charge of powder.

Referring to Fig. 4, it will be seen that when the powder has been discharged from the weighing bucket 28, it will enter the chute 77 as previously stated, and will be directed through the branch connection 78 into the powder receiving chamber 304 of the packing chamber or unit 79. This packing unit 79 (Fig. 4) is provided with a horizontal slide valve 114, and suitable vertical air passages 81.

It will be clear from the foregoing description by reference to Fig. 3 and from my copending application above, that being rigidly connected together, the packing chambers or units 79, manifold 94, and end brackets 90 and 91 comprise a movable reciprocating section of the packing mechanism which is raised and lowered in proper time with the other coacting parts of the machine to permit the empty cans to be properly positioned. But, the means by which this is accomplished will now be briefly described.

As the clutch shaft 17 rotates by reason of the engagement of the clutch mechanism 23 with the gear 21, as above described, motion is imparted from the gear 25 to the idle pinion 100, pinion 101, mounted on the short shaft 102, thence outer end of the pinion 103 (Fig. 3) on the inner end of said shaft 102, to gear 104 and to the shaft 105, all as will be clear from Figs. 1, 2, 3 and 5. The ratio of the gearing is such that one revolution of the shaft 105 coincides with one revolution of the clutch shaft 17 and takes place in substantially the same interval of time.

Rigidly mounted on the shaft 105 (Figs. 1, 3 and 4) is a cam 106 (Figs. 3 and 4) which, through the roller 107, cam lever 108, and connections to the rock shaft 110, imparts motion through suitable connections to the guide brackets 90 and 91 and raises and lowers the said movable section of the packing mechanism.

The mechanism thus far disclosed, it will be clear from the foregoing, weighs out a predetermined amount of powder, delivers the same into a chamber, raises the chamber and its coacting parts to permit an empty receptacle to be positioned, lowers said chamber to seal said receptacle from the outer air, and by the means of plungers packs the material in the receptacle. But in dealing with finely divided powders, it is very desirable to fill the receptacles after they are exhausted of their contained air for reasons stated in my application above, and to this end the air exhausting means will now be briefly disclosed.

As has been stated above, the same movement of the rock shaft 47 (Figs. 2 and 5) which throws the clutch 23 into engagement and starts the rotation of the clutch shaft 17 to start the machine, also opens the exhaust air valve F (Figs. 1, 2 and 5).

The opening of the exhaust air valve F allows the air to be exhausted through the pipe line 177 and manifold air conduit 94 (see arrows) from the can 89 to the vacuum tank 178 in which a partial vacuum is maintained, by the air pump 179, (Figs. 1 and 2).

Just before the machine completes a cycle of operations, the exhaust air valve F is closed by means of an arm 180 (Figs. 1 and 5) on the shaft 105, which brings the pin 181, mounted thereon, in contact with the bell-crank arm 182 pivotally mounted as at 183 on a bracket 184 held to the side frame A of the machine (Figs. 1 and 5). The bell crank 182 is connected to the three arm lever 171 of the air exhaust valve F, by the link 185, which three arm lever is free to return to its initial or closed position by reason of the pin 174 traveling in the slot 175.

Having described in detail the different mechanisms employed in carrying out this invention, I will proceed now to describe one complete cycle, embracing all the various operations of the machine. Previous to starting the machine, it must be understood that empty cans 89 have been properly placed in position on the track 192, and one can is in its proper position under the packing chamber 79. In order to accomplish the proper alining of the can with the packing chamber, the machine must be allowed to make one complete cycle by throwing the clutch into engagement by hand, before the powder cut-off gates 4, 4 are operated. When the hopper 1 is filled with powder and power is supplied to the pulley 19, the power shaft 18 is given constant rotation in the direction of the arrow. The powder cut-off gates 4 within the hopper 1 are now opened by hand to the position shown in Fig. 6 allowing powder to flow to the scale bucket 28, which upon receiving a predetermined amount, will overbalance the scale beam 27 and move downward, shutting off the flow of powder by reason of the pin 300, tripping the trip trigger 12, and permitting the toggle levers 6 and 7 to close the gates 4 under the influence of the weight 9 (Fig. 8). The continued downward movement of the scale bucket 28 (Fig. 13) brings the trip arm 33 of the latch 32 in contact with the trip 34, releases the bucket bottom 30 and causes the discharge of the powder into the chute 77. The downward swinging of the bucket bottom 30 throws the weighted arm 41 over the center and through the bar 44, unhooks the latch 45 from the holding arm 46 leaving the rock shaft 47 free to rock, and permit the clutch to be thrown into engagement, which movement through the link 169 also opens the exhaust air valve F (Fig. 5), as will be clear from my application above. It will be seen that the opening of the valve F is substantially coincident with the discharge of the powder into the chute 77.

The exhaust air valve F being open as the charge of powder is falling into the powder receiving chamber 304, there is an induced current of air flowing down through the chute 77, powder receiving chamber 304, foraminous material 119 and up through ports 82, 81 and manifold 94 to the exhaust air line 177 (Fig. 4). This current of air sucks or sweeps the charge of powder down into the receiving chamber, preventing the puffing out of dust into the surrounding atmosphere, as is usual in operations of similar nature. The scale bucket 28 and scale beam 27 being relieved of the weight of a charge of powder return immediately to the position shown in Fig. 6, under the influence of the weight 29. During this return movement the bucket bottom 30 is closed by the counter balancing weight 38. The scale mechanism is now in position to receive a subsequent charge of powder. Closely following the starting of the clutch shaft 17 the rock shaft 47 returns to its initial position, (Fig. 11) by the cam 56 acting through the arm 58; and the cam 59 is so timed as to reset the weighted lever 41 and return latch 45 through the arm 61 and reset bar 62. The rock shaft 47 is now held in its locked position until the shaft 17 has completed one revolution, when the clutch is disengaged through the action of the arm 50 engaging the anti-friction roller 52. Substantially coincident with the action of cams 56 and 59, the cam 65 throws the trip 34 out or possible engagement with the trip arm 33 and prevents any further discharge of powder from scale bucket 28 if the same should receive a second load, during the same cycle of the machine. The trip 34 is returned to its initial or tripping position slightly in advance of the disengagement of the clutch and of the stoppage of the clutch shaft 17.

While the foregoing operations are taking place, and early in the beginning of the rotation of the clutch shaft 17, the cam 70 (Figs. 6 and 8) thereon, by means of the arms 73 and 75 automatically opens the gates 4, and returns the arm 75 to its initial or down position. The trigger 12 under the influence of the weight 14 is also returned to its initial position supporting the roller 11, and holding the gates 4 open until tripped by the poising of the scale beam 27 during a subsequent operation.

When a charge of powder is weighed and discharged, as has been just described, the cross head 144 carrying the plunger 138 is in its upper or elevated position, as best seen in Fig. 4, and a slide valve 114 holds the powder resting thereon with the piece of foraminous material 119 permitting the air to be sucked through the passage 120 from the said powder and also from the vessel 89. When in this position, the trip hammer 160 (Figs. 3 and 4) falls on the upper portion of the chamber 78 by reason of the roller 163 passing out of engagement with the trip finger 165, and shakes any material which may be clinging to the chute 77, down into the chamber 304. Of course, it is understood that the shaft 105 is being rotated by means of power transmitted from the clutch shaft 17 through the gears 25, 100, 101, 103 and 104, as will be clear from Fig. 3.

The vibrations due to the impact of the hammer 160 on the chamber 78 and chute 77 also aid in effectually stripping the air from the powder which may linger in the chamber 304.

Closely following the action of the trip hammer 160, the plunger intermittent driving gear 151 (Figs. 1, 3 and 5) engages the intermittently driven gear 152 and imparts movement to the crank shaft 153, which, rotating in the direction of the arrow, through the coacting parts 155, 156 and 158, moves the cross head 144 downward, in the guides 150, which are carried by the side frames A and B of the machine. The subsequent operations serve to remove the valve 114 out of the way of the powder, to fill the packages 89 therewith and to compress the same in the said packages, all while the air is excluded, as will be clear from my copending application above, and need not be here repeated. The said application also makes it clear that the can is sealed against the atmosphere so that no powder is puffed out or lost during the operation.

It should be said in passing, however, that in order to properly and automatically position the receptacles 89, they are supported on the tracks 192, Figs. 1, 2 and 4, which are secured to the truss bars C and D of the frame of the machine. The said cans 89 are retained in position on the tracks by the guides 193, Fig. 2, and are advanced at the proper time by the fingers 194, Fig. 4, properly spaced on and attached to the chains 195. These said chains run on sprockets 196 rigid on the shaft 197, which shaft receives an intermittent movement from the cam 198 (Figs. 1 and 2) rigidly mounted on the end of the clutch shaft 17, through the roller 199, cam bar 200, ratchet arm 201, loosely mounted on the shaft 197, pawl 202 and ratchet wheel 203 rigid with the shaft 197, Figs. 1, 2, 3 and 5. The shaft 197 is journaled in extension brackets 204 which project in the rear of the frame of the machine. The tracks 192 and chains 195 may be of any desired length and supported in any convenient manner at any distance from the machine on the front, or side opposite to the shaft 197.

After the can is filled, as described in the said application, the clutch controlling the machine disengages, and the cycle is repeated.

It is obvious that those skilled in the art may vary the details of construction and the arrangement of parts without departing from the spirit of my invention, and therefore I do not wish to be limited to the above disclosure except as may be required by the claims.

What I claim is:—

1. In a powder filling machine, the combination of a hopper for containing powder; a weighing bucket having a bottom adapted to receive powder from said hopper; a scale beam supporting said bucket; means for holding said bottom closed while receiving powder from said hopper; means for releasing said bottom when said bucket has received a predetermined amount of powder; and means associated with said bucket bottom for governing the supply of powder to said bucket, substantially as described.

2. In a powder filling machine, the combination of a hopper for containing powder; valves in said hopper adapted to be opened and closed to control the supply of powder flowing therefrom; a weighing bucket having a bottom adapted to receive powder from said hopper; a scale beam supporting said bucket; means for holding said bottom closed while receiving powder from said hopper; means for releasing said bottom when said bucket has received a predetermined amount of powder; and means associated with said bucket bottom for cutting off the supply of powder to said bucket, substantially as described.

3. In a powder filling machine, the combination of a hopper for containing powder; means controlling the flow of powder from said hopper comprising weighted toggle links; means to lift the weight of said links; a weighing bucket adapted to receive powder from said hopper; and means associated with said weighing bucket adapted to control the movements of said weight lifting means, substantially as described.

4. In a powder filling machine, the combination of a hopper for containing powder; means controlling the flow of powder from said hopper comprising weighted toggle links and valves associated with said links; means comprising a lever and cam to lift the weight of said links; a weighing bucket adapted to receive powder from said hopper; and means associated with said weighing bucket adapted to control the movements of said weight lifting means, substantially as described.

5. In a powder filling machine, the combination of a filling hopper; a scale beam; a weighing bucket carried by said beam adapted to receive powder from said hopper; means associated with said beam and hopper for automatically controlling the flow of powder from said hopper to said bucket; and means governed from said bucket for moving said controlling means, substantially as described.

6. In a powder filling machine, the combination of a filling hopper; a scale beam; a weighing bucket carried by said beam adapted to receive powder from said hopper; a controlling means for said hopper; means comprising a shaft, a cam on said shaft and a lever operated by said cam for automatically moving said controlling means; and means associated with said beam and hopper for governing said controlling means, substantially as described.

7. In a powder filling machine, the combination of a filling hopper having a controlling means comprising a weight controlled valve; a scale beam; a weighing bucket carried by said beam adapted to receive powder from said hopper; means comprising a lever adapted to lift said weight for automatically governing the operation of said controlling means; means associated with said beam and hopper for governing said controlling means; and means associated with said bucket for governing said lever, substantially as described.

8. In a filling machine, the combination of a hopper; a weighing bucket adapted to receive powder from said hopper; a weight controlled valve for governing the flow of powder from said hopper to said bucket; a lever for lifting said weight; a cam for operating said lever; a shaft on which said cam is mounted; a clutch for governing the application of power to said shaft; a lever for controlling said clutch; and means associated with said bucket for controlling said last named lever, substantially as described.

9. In a filling machine, the combination of a hopper; a weighing bucket adapted to receive powder from said hopper; a weight controlled valve for governing the flow of powder from said hopper to said bucket; a lever for lifting said weight; a cam for operating said lever; a shaft on which said cam is mounted; a clutch for governing the application of power to said shaft; a lever for controlling said clutch; and means comprising a slotted rod and pivoted lever associated with said bucket for controlling said last named lever, substantially as described.

10. In a filling machine, the combination of a hopper; a weighing bucket adapted to receive powder from said hopper; a weight controlled valve for governing the flow of powder from said hopper to said bucket; a lever for lifting said weight; a cam for operating said lever; a shaft on which said cam is mounted; a clutch for governing the application of powder to said shaft; a lever for controlling said clutch; means associated with said bucket for controlling said last named lever; and means associated with said bucket and shaft for restoring certain of the parts to their normal positions, substantially as described.

11. In a filling machine, the combination of a hopper; a weighing bucket adapted to receive powder from said hopper; a weight controlled valve for governing the flow of powder from said hopper to said bucket; a lever for lifting said weight; a cam for operating said lever; a shaft on which said cam is mounted; a clutch for governing the application of power to said shaft; a lever for controlling said clutch; means associated with said bucket for controlling said last named lever; and means comprising cams on said shaft, and a sliding rod for restoring certain of the parts to their normal positions, substantially as described.

12. In a filling machine, the combination of a movable weighing bucket; a hinged bottom carried by said bucket; a lever controlled by the opening movement of said bottom; a clutch; connections between said clutch and lever; a rotating shaft controlled by said clutch; and means associated with said shaft for closing said bottom after it has been opened, substantially as described.

13. In a filling machine, the combination of a movable weighing bucket; a hinged bottom carried by said bucket; a lever controlled by the opening movement of said bottom; a clutch; connections between said clutch and lever; a rotating shaft controlled by said clutch; and means associated with said shaft comprising a cam, and a lever associated with said cam for closing said bottom after it has been opened, substantially as described.

14. In a filling machine, the combination of a filling hopper; a weighing bucket adapted to receive material from said hopper; a bottom in said bucket adapted to be opened and closed; a chamber adapted to receive said material from said bucket when said bottom is opened; means for compacting said material in said chamber; a rotating shaft; means associated with said bottom adapted to control the rotations of said shaft; and means controlled by said shaft for closing said bottom after it has been opened, substantially as described.

15. In a filling machine, the combination of a filling hopper; a weighing bucket adapted to receive material from said hopper; a bottom in said bucket adapted to be opened and closed; a chamber adapted to receive said material from said bucket when said bottom is opened; means for compacting said material in said chamber; a rotating shaft; means associated with said bottom adapted to control the rotations of said shaft; means controlled by said shaft for controlling the compacting operations; and means operated by said shaft for closing said bottom after it has been opened, substantially as described.

16. In a filling machine, the combination of a filling hopper; means for controlling the flow of material from said hopper; a weighing bucket adapted to receive material from said hopper; a bottom in said bucket adapted to be opened and closed; a chamber adapted to receive said material from said bucket when said bottom is opened; means for compacting said material in said chamber; a rotating shaft; means associated with said bottom adapted to control the rotations of said shaft; means governed by said shaft for operating the flow controlling means in said hopper; means governed by said shaft for controlling the compacting operations; and means controlled by said shaft for closing said bottom after it has been opened, substantially as described.

17. In a filling machine, the combination of a filling hopper; a valve governing the flow of material from said hopper; a weighing bucket adapted to receive material from said hopper; a bottom for said bucket adapted to be opened and closed; a catch movable up and down with said bucket to hold said bottom closed; a stop to engage said catch and release said bottom; means to move said stop out of the path of said catch; a chamber adapted to receive said material when said bottom is open; means for compacting said material in said chamber; a rotating shaft; connections associated with said bottom adapted to control the rotations of said shaft; means controlled by said shaft for governing said valve; means controlled by said shaft for governing the movements of said stop; and means controlled by said shaft governing the movements of said compacting mechanism, substantially as described.

18. In a filling machine, the combination of a filling hopper; a valve governing the flow of material from said hopper; a weighing bucket adapted to receive material from said hopper; a bottom for said bucket adapted to be opened and closed; a catch movable up and down with said bucket to hold said bottom closed; a stop to engage said catch and release said bottom; means to move said stop out of the path of said catch; a chamber adapted to receive said material when said bottom is open; means for compacting said material in said chamber; means for exhausting the air from said compacted material; a rotating shaft; connections associated with said bottom adapted to control the rotations of said shaft; means controlled by said shaft for governing said valve; means controlled by said shaft for governing the movements of said stop; means controlled by said shaft for governing the air exhausting means; and means controlled by said shaft governing the movements of said compacting mechanism, substantially as described.

In testimony whereof, I affix my signature, in presence of two witnesses.

HAYWOOD GUION DEWEY.

Witnesses:
FRANK R. CASSELL,
WM. L. ARMACOST.

Copies of this patent may be obtained for five cents each, by addressing the "Commissioner of Patents, Washington, D. C."